(12) United States Patent
Scott

(10) Patent No.: US 6,441,522 B1
(45) Date of Patent: *Aug. 27, 2002

(54) ELECTROMAGNETIC APPARATUS EMPLOYING HIGH PERMEABILITY LOW CONDUCTIVITY ELEMENT

(75) Inventor: Harold C. Scott, Lafayette, CO (US)

(73) Assignee: Coleman Powermate, Inc., Kearney, NE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/541,373

(22) Filed: Mar. 31, 2000

(51) Int. Cl.⁷ .............................................. H02K 21/12
(52) U.S. Cl. ........................... 310/156.23; 310/156.21; 310/156.38; 310/156.49
(58) Field of Search ................. 310/261, 264, 310/267, 216, 218, 156.01, 156.12, 156.15, 156.21, 156.23, 156.27, 156.38, 156.44, 156.45, 156.46, 156.48, 156.49, 156.51, 156.54, 156.55, 156.59, 156.65, 156.75, 156.76, 156.77

(56) References Cited

U.S. PATENT DOCUMENTS

| | | | | |
|---|---|---|---|---|
| 3,237,034 A | * | 2/1966 | Krasnow | 310/156 |
| 3,334,254 A | * | 8/1967 | Kober | 310/156 |
| 4,425,521 A | * | 1/1984 | Rosenberry, Jr. et al. | 310/214 |
| 4,459,501 A |   | 7/1984 | Fawzy | 310/156 |
| 4,565,938 A |   | 1/1986 | Fawzy | 310/156 |
| 4,663,536 A |   | 5/1987 | Roesel, Jr. et al. | 290/7 |
| 4,724,348 A | * | 2/1988 | Stokes | 310/152 |
| 4,763,053 A |   | 8/1988 | Rabe | 318/254 |
| 4,947,065 A | * | 8/1990 | Ward et al. | 310/44 |
| 4,953,284 A | * | 9/1990 | Hammer et al. | 29/596 |
| 5,191,256 A | * | 3/1993 | Reiter, Jr. et al. | 310/156 |
| 5,214,839 A | * | 6/1993 | Rieber et al. | 29/596 |
| 5,298,827 A |   | 3/1994 | Sugiyama | 310/156 |
| 5,369,323 A |   | 11/1994 | Allwine, Jr. | 310/49 R |
| 5,691,683 A |   | 11/1997 | Allwine, Jr. | 335/306 |
| 5,723,933 A |   | 3/1998 | Grundl et al. | 310/266 |
| 5,767,601 A | * | 6/1998 | Uchiyama | 310/190 |
| 5,861,695 A |   | 1/1999 | Brassard | 310/154 |

(List continued on next page.)

FOREIGN PATENT DOCUMENTS

| | | |
|---|---|---|
| DE | 195 02 184 | 8/1996 |
| GB | 2 275 134 | 8/1994 |
| GB | 2 338 116 | 12/1999 |
| WO | WO 99/50949 | 10/1999 |

OTHER PUBLICATIONS

E. Muljadi, et al., Axial Flux, Modular, Permanent–Magnet Generator with a Toroidal Winding for Wind Turbine Applications, Presented at IEEE Industry Applications Conference, Nov. 5–8, 1998.

Primary Examiner—Burton S. Mullins
Assistant Examiner—Dang Dinh Le
(74) Attorney, Agent, or Firm—William R. Bachand; Squire, Sanders Dempsey, L.L.P.

(57) ABSTRACT

A pole for use in a magnetic circuit includes a flux-passing portion for passing magnetic flux and a cap. The flux-passing portion has a face through which at least some of the magnetic flux passes and to which the cap is fixed. The cap is made of a permeable material and is formed to impede eddy currents in the cap. The cap may have a top and bottom surface joined by a shoulder to provide a distribution of magnetic flux through the shoulder that is less concentrated than the flux distribution through a 90-degree corner. The pole may be incorporated into a generator, a motor, a linear motor, or a portable engine-driven generator to increase the efficiency thereof.

36 Claims, 5 Drawing Sheets

U.S. PATENT DOCUMENTS

| | | | |
|---|---|---|---|
| 5,874,796 A | 2/1999 | Petersen | 310/156 |
| 5,925,964 A | 7/1999 | Kusase | 310/263 |
| 5,936,320 A | 8/1999 | Takeda et al. | 310/89 |
| 5,952,755 A * | 9/1999 | Lubas | 310/156 |
| 6,037,694 A | 3/2000 | Asao et al. | 310/261 |
| 6,087,755 A | 7/2000 | Suzuki et al. | 310/254 |
| 6,300,702 B1 | 10/2000 | Jack et al. | 310/216 |
| 6,157,102 A | 12/2000 | Suzuki et al. | 310/44 |
| 6,288,460 B1 * | 9/2001 | Fakult et al. | 310/52 |

* cited by examiner

VIEW A-A

ELECTROMAGNETIC APPARATUS EMPLOYING HIGH PERMEABILITY LOW CONDUCTIVITY ELEMENT

BACKGROUND OF THE INVENTION

The present invention relates to electromagnetic apparatus and to elements in the magnetic circuits of such apparatus for reducing eddy currents.

In general, electromagnetic apparatus including machines for converting between the mechanical and electrical energy are well known, e.g., motors and generators. Such conversion machines typically comprise a rotor and stator arranged for relative motion, e.g., rotation or linear displacement. In an electric motor, varying magnetic fields are typically generated by the stator. These fields interact with a magnetic field associated with the rotor, imparting motion to the rotor, e.g., causing the rotor to turn. Conversely, in a generator, the rotor is driven by a mechanical energy source (e.g., a motor or engine) and generates a magnetic field (using either permanent magnets or windings), which interacts with windings formed on the stator. As the magnetic field of the rotor intercepts the windings on the stator, an electrical current is induced in the stator windings. The induced current is typically applied to a bridge rectifier, regulated, and provided as a DC output power signal from the generator. The output of the bridge rectifier may be applied to an inverter to provide an AC output power signal. Electromagnetic apparatus includes machines that operate with direct current, single phase alternating current, or polyphase alternating current. Such apparatus may operate with relatively continuous motion (e.g., a turbine driven generator) or intermittent motion (e.g., a stepper motor or a linear positioning motor).

Examples of portable engine driven generators (gensets) are described in U.S. Pat. No. 5,929,611 issued to Scott et al. on Jul. 27, 1999; U.S. Pat. No. 5,625,276 issued to Scott et al. on Apr. 29, 1997; U.S. Pat. No. 5,705,917 issued to Scott et al. on Jan. 6, 1998; U.S. Pat. No. 5,780,998 issued to Scott et al. on Jan. 14, 1998; U.S. Pat. No. 5,886,504 issued to Scott et al. on Mar. 23, 1999; U.S. Pat. No. 5,900,722 issued to Scott et al. on May 4, 1999; and U.S. Pat. No. 5,929,611 issued to Scott et al. on Jan. 27, 1999; all commonly assigned with the present invention. Portable power conversion systems find particular utility as power sources and vehicular battery charger/jump start units. Power may be used for lights, small appliances, or in connection with recreational vehicles. These uses typically arise at construction or camping sites.

Generators that use permanent magnets to develop the requisite magnetic field tend to be lighter and smaller than generators that use field windings for that purpose. However, the power supplied by a permanent magnet generator has historically been difficult to regulate or control. The voltage provided by a generator may vary significantly according to the rotational speed of the rotor (e.g., measured in RPM). In addition, this output voltage tends to vary inversely with the current delivered so that, as the current delivered to a given load increases, the output voltage provided by the generator across the load decreases.

Rotors employing high energy product magnets and consequence poles are also known. Such rotors are described in, for example, the aforementioned U.S. Pat. No. 5,705,917. That rotor employs a body of soft-magnetic material carrying a plurality of permanent, high energy product magnets. These magnets may have a flux density of at least on the order of five kilogauss and may be suitably formed of a rare earth alloy such as neodymium iron boron, or samarium cobalt. These magnets are disposed on a peripheral surface of the body of the rotor, mounted in recesses (also called insets) formed in the rotor surface. The portions of the soft magnetic rotor body between the recesses form respective consequence poles.

Rare earth materials tend to be extremely expensive. Accordingly, it is desirable to minimize the amount of these materials used. However, at the same time, it is desirable to generate relatively high flux densities. In the preferred embodiment of the aforementioned U.S. Pat. No. 5,705,917, the magnets employed are relatively thin (e.g. about 1/10 of an inch thick) and present a relatively large area (e.g., about 3/4 of an inch by about one inch) to minimize the amount of high energy product magnet used. By maximizing the area of the permanent magnet relative to the area of the consequence pole, a desirable total flux is achieved with a smaller diameter core. Less weight and less magnetic material are typically used with a smaller diameter core.

In addition, it is also known that permanent magnets are subject to demagnetization when exposed to high temperatures and/or high magnetic flux. Heating permanent magnets to near their Curie temperature can cause demagnetization and result in loss of other performance characteristics. Permanent magnets installed in conventional rotors are susceptible to physical damage and/or demagnetization from eddy current heating and heat associated with mechanical vibrations induced from air gap harmonics. Such heat may be particularly evident at the permanent magnet surface (e.g., during exposure to flux changes across the air gap). In addition, permanent magnets on rotors are subject to the electromagnetic fields generated by current induced in the stator windings. Shorts in simple turn-to-turn or phase-to-phase stator windings may produce dramatic heating of magnets installed in conventional rotors and thus lead to demagnetization.

Attempts have been made to a avoid demagnetization of rotor magnets due to electromagnetic fields associated with current flow in the stator windings. For example, U.S. Pat. No. 5,298,827 issued to Sugiyama on Mar. 29, 1994 describes a permanent magnet dynamoelectric machine rotor in which a ferromagnetic material (e.g., high magnetic permeability soft iron) is attached to the outer magnetic pole face of each of the permanent magnets. The magnetic flux generated by the stator windings passes through the ferromagnetic material so that demagnetization of the permanent magnets caused by flux generated by the stator windings can be reduced.

The flux path or magnetic circuit formed in a conventional electromagnetic machine is generally supported by high permeability materials formed as stacks of laminations electrically insulated from each other. Electrical insulation interrupts eddy current flow, reducing energy losses and avoiding localized resistive heating in the regions of the eddy currents. The flow of flux between laminations is inhibited. Because conventional laminations are generally planar, electromagnetic machine design has been limited to implementing flux paths in two dimensions through laminated members.

SUMMARY OF THE INVENTION

A pole for use in an electromagnetic apparatus in an implementation according to various aspects of the present invention has a magnetic circuit that includes a flux-passing portion for passing magnetic flux and a cap. The flux-passing portion has a face through which at least some of the magnetic flux passes and to which the cap is fixed. The cap is made of a permeable material and is formed to impede eddy currents in the cap.

By forming the cap of material having relatively low conductivity (e.g., an insulator or substantially nonconductive material), energy losses in eddy currents may be reduced or avoided. The heat generated by such eddy currents may be reduced or avoided. The detrimental consequences of local heating (e.g., tempering, expansion, convection, infrared radiation, etc.) due to such eddy currents is consequently reduced or avoided. In one implementation, the cap is formed from a particulate permeable material disposed in a binder. A method of forming the cap may include the steps of: (a) providing a powder comprising particles having magnetically soft permeability each coated with a binder, the binder having lower conductivity than soft iron; (b) molding the powder to form the cap; and (c) heating the powder so that the powder forms a matrix of soft iron particles disposed in a solid formed from the binder.

The cap may have a top and bottom surface joined by a shoulder to provide a distribution of magnetic flux through the shoulder that is less concentrated than the flux distribution through a 90-degree corner. When concentrations of flux are distributed, eddy current losses may be lower and heating due to eddy current losses may be reduced or avoided.

The pole may be incorporated into any electromagnetic apparatus to increase an operating efficiency, for example, a motor, a linear motor, an alternator, a generator, or a portable engine-driven generator.

An electromagnetic apparatus according to various aspects of the present invention has a flux circuit supported at least in part by a permeable material that is formed to impede eddy currents. In an implementation for rotary motion, the apparatus may include a first pair of permanent magnet poles spaced apart on a circumference centered on the axis of rotation. Each pole may include a permanent magnet and a cap as discussed above. The implementation may further include a second pair of poles implemented to face the first pair to complete a flux circuit. The second pair of poles may be provided in magnetic communication with a support and spaced apart on a second circumference centered on the axis of rotation. The support may be formed at least in part by a permeable material that is formed to impede eddy currents. When a winding is provided between the second poles to pass through the flux circuit, rotation of the first poles with respect to the second poles may give rise to a current in the winding. When the second poles are spaced apart in separate parallel planes, the winding may be formed in a plane generally between the second poles and encircling the support within a relatively small range of radii from the axis of rotation.

By forming the support of a permeable material that impedes eddy currents, the electromagnetic apparatus operates at higher energy efficiency. Localized heating with consequential dimensional changes can be avoided.

BRIEF DESCRIPTION OF THE DRAWING

The preferred exemplary embodiment of the present invention will hereinafter described in conjunction with the appended drawing, where like designations denote like elements, and.

DETAILED DESCRIPTION OF EXEMPLARY EMBODIMENTS

Electromagnetic apparatus generally includes apparatus for converting motion to and from electrical energy. In operation, an electric current may produce a physical force (or vice versa) in accordance with one or more magnetic circuits, each typically including an electromagnet through which the electric current passes. The physical force generally acts to move one or more components of a magnetic circuit (as in a motor) or is externally supplied to convert the force to a resulting current that passes through a coil or other portion of a magnetic circuit (as in a generator). The magnetic circuit typically includes components of high magnetic permeability arranged in a closed path for passage of magnetic flux. As implied above, a conventional motor or generator may have numerous magnetic circuits each contributing to the overall purpose of the apparatus. Components formed of high permeability material provide a low impedance path for passage of magnetic flux and so provide a mechanism for producing regions (e.g., gaps) where magnetic flux density is high for efficient interaction with other members of the electromagnetic apparatus.

A magnetic pole (or herein simply a pole) includes any structure used in a magnetic circuit for the passage of magnetic flux (or herein simply flux). A pole may operate, for example, as a central member of an electromagnet, a portion of a stator, or a portion of a rotor, and may provide a face defining a gap as may be necessary to allow motion among members of one or more magnetic circuits as discussed above. A pole typically includes a portion (herein called a flux-passing portion) that passes flux over some necessary or desirable distance which may be linear or any convenient nonlinear form. The flux-passing portion may (though not necessarily) include one or more permanent magnets, electromagnets, or a combination of permanent magnets and electromagnets. Any number of poles may be formed as a physical unit or joined together to cooperate for passing flux and providing any number of defined regions of high flux density, perhaps arranged in numerous spacial orientations as desired.

A pole structure (herein also briefly called a pole) operative as one or more magnetic poles, according to various aspects of the present invention, suitably includes physical characteristics for reducing eddy currents which may otherwise flow in the structure. Eddy current flow may be reduced according to various aspects of the present invention: (a) by including a cap in a region of varying magnetic flux density and/or direction, the cap formed of material having relatively low electrical conductivity; (b) by including a cap as above formed of laminated material arranged to impede eddy currents; (c) by providing a shoulder in a region of the pole where high flux densities are expected, the cap for lowering the spacial concentration of flux; or (d) by a suitable combination of the above techniques.

Figure 1:
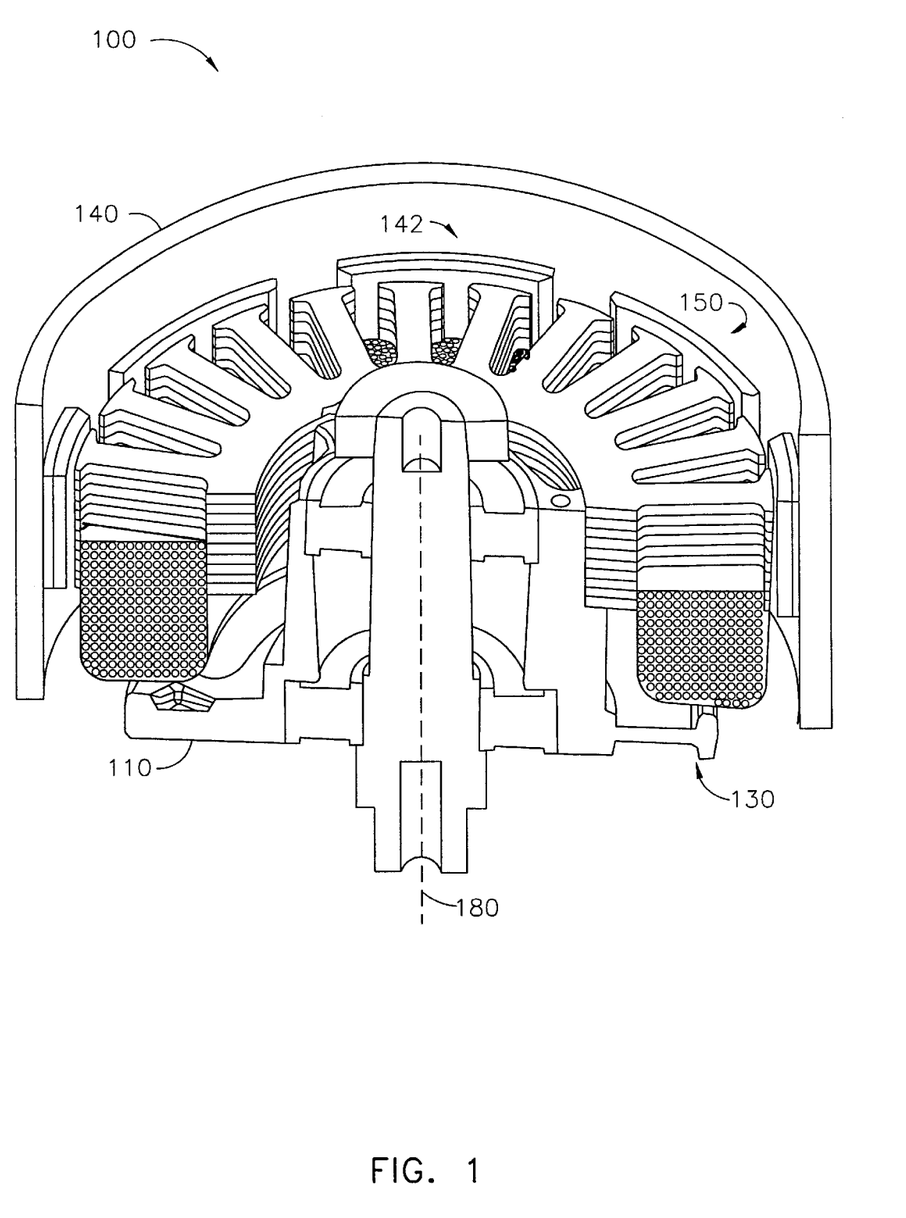
FIG. 1 is a perspective cross section of a three-phase alternator according to various aspects of the present invention.

In a three-phase AC rotary alternator implementation of an exemplary electromagnetic apparatus according to various aspects of the present invention, (FIGS. 1 through 4) poles of a stator and opposing poles of a rotor may be suitably arranged along first and second concentric arcs (typically extending 360 degrees). The first arc may have a smaller radius than the second (e.g., a stationary internal stator with external coaxial rotor) or vice versa. For example, referring to FIG. 1, an exemplary alternator 100 includes stator 110 and rotor 140 that rotates about axis 108. Stator 110 includes conventional windings 130 (shown in partial cross section) about each pole (e.g., 24 poles) of stator 110 that generate current according to each phase (i.e., a conventional three-phase winding). Rotor 140 includes eight poles in alternating spaced arrangement about an interior face and circumference of rotor 140 represented by active pole 142 and consequence pole 152. As shown, rotor 140 is driven by a prime mover (not shown) to generate current in windings 130 of stator 110.

Figure 2:
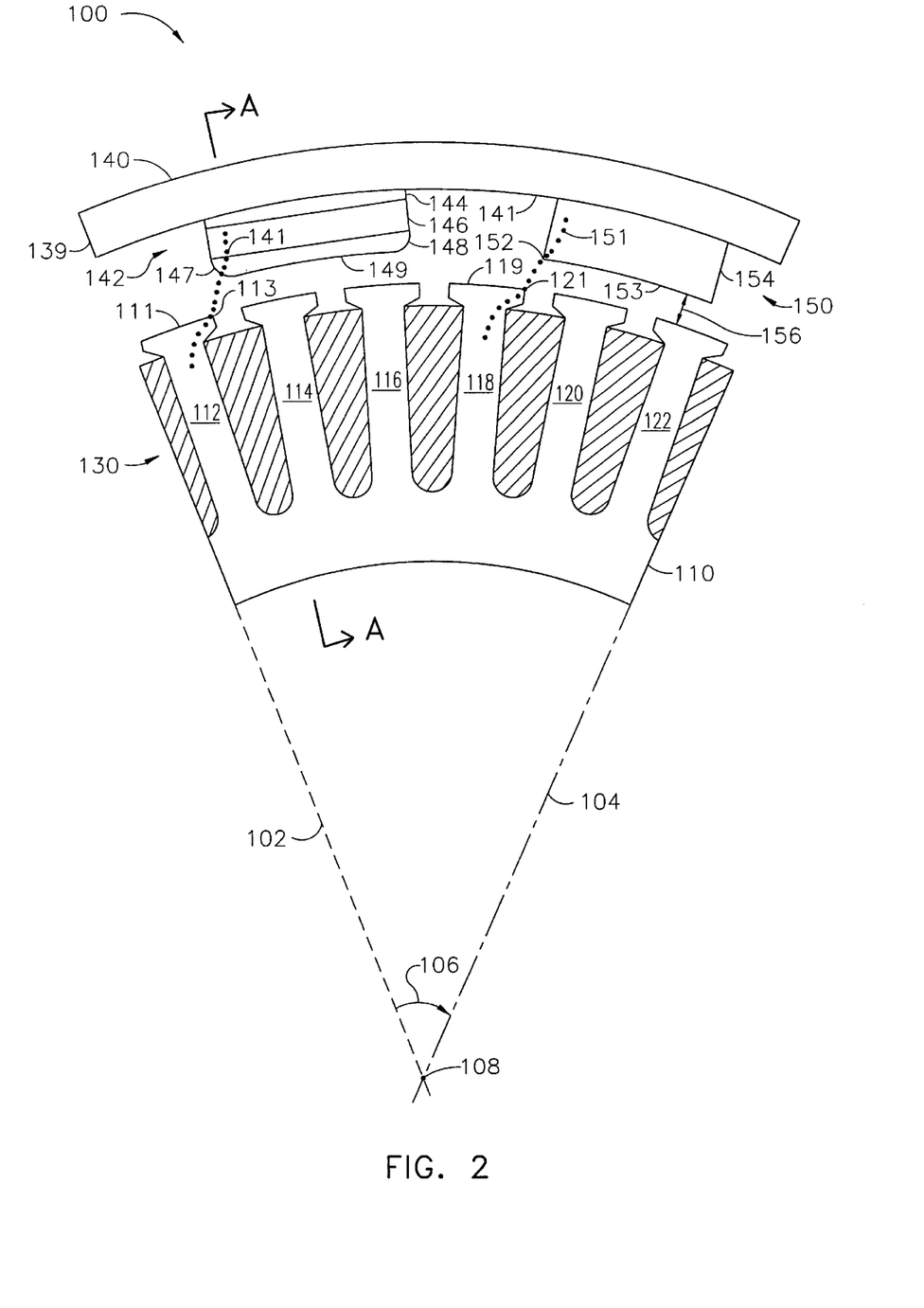
FIG. 2 is a cross section of the alternator of FIG. 1.

Referring to FIG. 2, an exemplary pie-shaped segment of a cross section of alternator 100 is represented by an arc 106 of about 45 degrees between radial lines 102 and 104 which extend from the center of rotation 108. Substantially identical segments are suitably repeated about center 108 to complete a circular cross section. Alternator 100 includes stator 110, windings 130 (cross hatched), rotor 140, and gap 156 (enlarged for clarity of presentation). Gap 156 is typically maintained by conventional bearings and may be relatively small (e.g., in the range of, for example, 0.02 to 0.06 inch, and preferably about 0.03 inch).

Stator 110 suitably includes a plurality of poles 112, 114, 116, 118, 120 and 122 and winding 130, conventionally arranged to accomplish the purpose of the electromagnetic apparatus. The structure of each pole may be uniform or may vary from one pole to the next and may be of conventional construction or constructed in accordance with principles of the present invention. For example, all poles of stator 110 are of a conventional laminated structure, the laminations being parallel to the plane of rotation. Winding 130 may be formed of multiple conductors in any conventional manner. For example, enameled magnet wire may be wound automatically on the flux-passing portions of poles 112 through 122. In a conventional three phase manner, poles 112 and 118 may be phase A, poles 114 and 120 may be phase B, and poles 116 and 122 may be phase C. Each pole includes a flux-passing portion and a face. For example, pole 112 includes face 111 having a corner 113; and, pole 118 includes face 119 having corner 121. Faces 111 and 119 may be flat or slightly rounded for less variation in the operative gap 156 as the face moves across a region of a rotor pole. Stator 110 may be electrically and magnetically configured in a manner suitable for alternator 100 by applying the principles of stator construction described in aforementioned U.S. Pat. No. 5,886,504.

Rotor 140 suitably includes an arcuate body 139 for supporting a number of poles arranged to accomplish generating an alternating current in winding 130. Body 139 serves also as a casing and may be formed of soft iron, steel, or nickel alloy. The number of rotor poles may be similar or different from the number of stator poles, e.g., poles 112 through 122. Rotor poles may be of uniform structure or may vary in structure from one pole to the next. Variation may be according to conventional construction or construction in accordance with principles of the present invention.

For example, rotor 140 includes two types of poles represented by active pole 142 and consequence pole 150 that are arranged in alternating sequence about center 108.

Any member of a magnetic circuit for directing flux to a desired gap may constitute a consequence pole. Typically, a consequence pole is a passive member of a magnetic circuit in as much as it does not include a source of flux. For example, consequence pole 150 includes radial flux-passing portion 154 and generally transverse face 153. Face 153 meets a side of flux-passing portion 154 at corner 152. Corner 152 may include an angle of about 90 degrees between the side of flux-passing portion 154 and face 153 in the region near corner 152.

Pole 142 likewise suitably includes a radial flux-passing portion and a generally transverse face. Flux-passing portion includes a base 144, a magnet 146, and a cap 148. Conventional cements (preferably flexible to accommodate different thermal expansion coefficients) may be used to affix base 144 to inner surface 141 of rotor 140, to affix magnet 146 to base 144, and to affix cap 148 to magnet 146. Base 144 and cap 148 are designed, inter alia, to reduce the cost of magnet 146. To reduce cost, magnet 146 suitably provides substantially flat mounting surfaces and is as thin as practical while still meeting operating goals of alternator 100. Such a magnet may be formed in a flat strip and economically cut to appropriate dimensions.

Base 144 provides a flat surface for mounting magnet 146, and manifests suitable permeability to serve its role in the magnetic circuit comprising portions of rotor 140 and stator 110. Base 144 also manifests suitable thermal characteristics (e.g., dimensional stability, bonding characteristics, and capable of expected thermal cycles). Base 144 may be formed in the same manner discussed below with reference to cap 148, or formed of magnetically soft material (e.g., iron, soft iron, steel, or nickel alloy) in any conventional manner. Base 144 may be integral to body 139 or affixed to body 139 in any conventional manner (e.g., suitable fasteners or adhesives). Base 144 may be omitted and surface 141 may be formed directly on body 139 (e.g., by casting, extrusion, or milling) to provide a flat surface (e.g., an inset, flat, or plateau) on which to seat magnet 146. Surfaces 141 and the opposing surfaces of base 144 (if used) may be prepared in any conventional manner to facilitate location, alignment, seating, or attachment of magnet 146, including for example, slotted or notched surface configurations.

A magnet provides a source of magnetic flux. For example, magnet 146 may be a relatively light weight high energy product permanent magnet (e.g. flux density of at least on the order of 5 kilogauss) comprising a rare earth alloy (e.g., neodymium iron boron, or samarium cobalt). Such rare earth materials tend to be extremely expensive, and, accordingly, it is desirable to minimize the amount of material used. However, at the same time, it is desirable to generate relatively high flux densities. In the preferred embodiment, magnet 146 is relatively thin (e.g., on the order of 0.1 inch thick measured radially from center 108) and has a relatively large cross sectional area (e.g., about 0.75 sq. inch, ¾" by 1") to minimize the amount of high energy product magnet used. A magnet having an energy product greater than 40,000, preferably about 48,000 may be used as provided, for example, by Grades 44 or 48 material marketed by UGIMax Inc. These materials are suitable for alternator maximum operating temperatures of about 80 degrees Celsius.

In accordance with one aspect of the present invention, the overall size of the electromagnetic apparatus and amount (e.g., total volume) of high energy product magnetic material used are minimized for a given total flux in each magnetic circuit. Specifically, the cross sectional area of magnet 146 may be greater than the area of face 153 of consequence pole 150 by approximately the ratio of the flux density produced by magnet 144 to the allowed flux density of consequence pole 150. By maximizing the cross sectional area of magnet 144 relative to consequence pole 150, alternator 100 may have a smaller overall diameter for a desired total flux. A smaller overall diameter results in less weight and less magnetic material being required for a desired total flux.

Consequence pole 150 is spaced apart from pole 142 to an extent significantly larger than air gap 156 between rotor and stator (e.g., at least five times greater) to ensure that the majority of magnetic energy is directed into the stator rather than between flux-passing portions of the respective poles.

In an alternate implementation of alternator 100, poles 142 and 150 may be part of a hub and oriented to face away from center 108; and, poles 112 through 122 may be part of the inside of a hollow cylinder coaxial with center 108. Either the hub or the cylinder (or both) may move with respect to each other. Pole 142 (and poles of similar structure located about center 108) may be wrapped in a non-metallic material (e.g., fiberglass tape) to secure its components (144, 146, 148) against centrifugal forces generated by rotation. Further, alternator 100 is generally representative of electromagnetic apparatus including generators and motors, as discussed above. Principles of construction and operation discussed with reference to alternator 100 apply analogously to these other types of electromagnetic apparatus.

Magnetic circuit efficiency may be improved by reducing eddy current through use of a high permeability, low conductivity (HPLC) element. Such an element may also provide structure for support or mounting of other components of the electromagnetic apparatus, provide routing of flux in unconventional paths, or provide a measure of insulation from environmental effects including thermal, vibration, or corrosion resistance. An HPLC element, according to various aspects of the present invention, includes any member of a magnetic circuit that passes a varying flux yet impedes the flow of eddy current that would otherwise flow in the element due to variation in the flux. Flux may vary in magnitude, in spacial direction, or in both magnitude and direction.

HPLC elements may be formed using a particulate having a predetermined magnetic permeability or range of permeability. The particulate may be introduced and/or mixed with a suitable conventional material (generally herein called a binder) for forming an element of suitable stable dimensions (e.g., rigid, flexible, malleable, or elastic). The binder may comprise a conventional adhesive, plastic, molding compound, or potting compound. The binder may be in fluid, paste, or powder form to facilitate mixing with the particulate. The particles may be coated with the binder and then treated to effect interparticle bonding. Preferably, the binder is applied to coat each particle to facilitate handling. Suitable coatings include inorganic compounds (e.g., phosphide preparations) or organic compounds (e.g., resins, thermoplastics, or Bakelite marketed by E. I. Dupont). Treatment to effect bonding may include any conventional combination of pressure and/or heat. Heat may be applied to cure the coating on the particles and/or to activate adhesion among the particles (e.g., when molded in a desired shape). Other activated coatings may be used including multi-part adhesives and plastics activated by mixing, and conventional materials activated by ultraviolet light.

Particles may include any mix including high permeability material (e.g., iron, soft iron) and may include non-magnetic and paramagnetic material (e.g., alloys of iron and/or alloys of nickel) where desired to achieve suitable structural or insulative properties perhaps at the expense of some permeability. Particles may be coated to avoid corrosion, facilitate storage, or facilitate formation of HPLC elements, as discussed above. Particles may be of any size or mix of sizes (e.g., from about 45 to about 600 microns, preferably from about 75 to about 150 microns) suitable for storage and formation of HPLC elements. For example, ATOMET EM1 marketed by Quebec Metal Powders, Inc. may be used.

An HPLC element may be formed in accordance with a method comprising: (a) providing a powder comprising particles having magnetically soft permeability each coated with a binder, the binder having lower conductivity than soft iron; (b) molding the powder in the shape of the HPLC element; and (c) heating the powder so that the powder forms a matrix of soft iron particles disposed in a solid formed from the binder. The powder suitably comprises soft iron particles varying in size primarily (by weight) in the range from about 60 to about 220 microns, preferably from about 75 to about 150 microns in diameter. The coating may comprise Bakelite. Powder may be poured, blown, or pressed into a conventional mold for example of a type typically used for plastic parts manufacturing. The interior of the mold may be treated with a conventional release agent. Curing sufficient to form a rigid matrix of particles that are electrically isolated from each other may be accomplished by one or more cycles of heating followed by cooling to avoid cracking, chafing, or other surface irregularities using conventional techniques. Vibration of the mold may promote isolation of particles to good effect. Vibration of the mold may be used to promote obtaining a particular size particle in a desired position or region of the mold.

Composition and manufacture of HPLC elements of the type described herein may be selected from exemplary materials and processes described in the following publications. Each publication and its references are incorporated herein. Lubricated Iron Powder Mixes for Low Frequency Soft Magnetic Applications by L.-P. Lefebvre, et al.; Effect of Curing Conditions on Properties of Iron-Resin Materials for Low Frequency AC Magnetic Applications by C. Gelinas, et al.; Effect of Thermal Cycling on Properties of Soft Magnetic Iron-Resin Composites by S. Pelletier, et al.; Iron-resin Composite Materials for AC Magnetic Applications by C. Gelinas and J. M. Battison; and Imminent Changes in Soft Magnetic Devices by J. Mark Battison and Claude Gelinas; all published on the World Wide Web by Quebec Metal Powders Limited at www.qmppowders.com.

Particles of predetermined geometry, e.g., substantially spherical particles, that are separated from each other by a generally uniform distance suitable for providing a desired breakdown voltage may be used to limit (e.g., reduce, minimize, or practically eliminate) eddy currents in regions of wide dynamic range of magnetic flux density and/or direction. Substantially uniform permeability in all directions may be so obtained. Where permeability is to be higher in one or more directions with reference to a reference direction, suitable particle shape, size, and orientation may be used. To assure a desired orientation of particles, curing (e.g., activating the binder to facilitate interparticle binding) may be accomplished under the influence of a stable magnetic field. To assure random alignment of particles, curing may be accomplished under the influence of a demagnetizing field (e.g., fields from moving permanent magnets, moving electromagnets, an alternating current electromagnet or an RF field).

An HPLC element may be used adjacent to a gap or discontinuity of materials in any electromagnetic apparatus discussed above. An entire pole may constitute an HPLC element (e.g., consequence pole 150 may be entirely homogeneous HPLC material); or, one or more portions of a pole (e.g., where eddy current losses are to be limited) may constitute HPLC elements. For example, base 144 and/or cap of pole 142 may be formed as HPLC elements.

Cap 148 suitably provides the transverse face of active pole 142 adjacent to gap 156 in the magnetic circuits comprising permanent magnet 146. In accordance with one aspect of the present invention, cap 148 limits eddy current flow with consequential benefits in reduced heat generation and higher efficiency of electromagnetic apparatus operation. For example, cap 148 passes flux between stator poles 112–122 and permanent magnet 146. When a pole (e.g., pole 112) is a strong source or sink of flux, the direction of flux passing through cap 148 varies considerably as the pole (e.g., 112) moves into, through, and out of the active range of pole 142. Because cap 146, when formed as an HPLC element, provides high permeability for all directions of flux and because cap 146 may serve as a bulk electrical insulator, eddy currents are limited which may otherwise have been of substantial magnitude.

Figure 3:
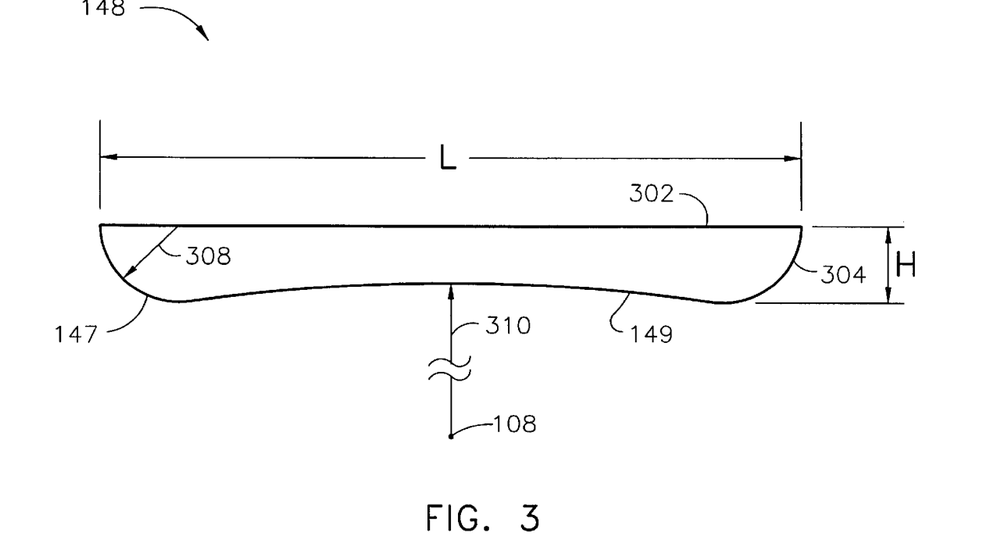
FIG. 3 is a cross section of a cap used in the alternator of FIGS. 1 and 2.

Referring now to FIG. 3, cap 148 suitably includes a mounting surface 302, a face 149, and shoulders 147 and 304 that join surface 302 and face 149. Preferably, the height of a cap (e.g., height H of cap 148) is determined in accordance with the following trade-off: (a) increasing cap thickness decreases operative motive force because reduced flux magnitude in the operative magnetic circuit results from the series effect of imperfect permeability of the cap; yet, (b) increasing cap thickness reduces the variation in flux direction and magnitude passed by magnet 146, consequently reducing eddy current energy losses and eddy current induced heating of magnet 146. When magnet 146 is about 0.1 to about 0.2 inches thick, cap 148 height H is preferably about 0.1 to 0.2 inches thick also. Cap height may be from about 50% to about 75% of magnet thickness, preferably from about 60% to about 70%.

The above trade-off may be restated in terms of the cost (i.e., amount of material) of magnet 146. The amount of material needed in magnet 146 is determined to meet design requirements of alternator 100 and to avoid premature demagnetization of magnet 146 (e.g., torque, speed, mechanical power, voltage, current, or electrical power, and operative life). Demagnetization may occur as a consequence of exposure to heat (e.g., produced in part by eddy currents) and flux passing through the permanent magnetic that is not aligned with the flux provided by the permanent magnet. Due to the effect of increased cap thickness as in (a) above, more material may be needed for magnet 146. Due to the effect of increased cap thickness as in (b) above, magnet 146 may be less likely to become demagnetized and less magnet material may be needed. In addition, higher energy product magnetic materials may be used with a suitable cap because the magnet is then not exposed to eddy current or hysteresis induced heat. A suitable cap also reduces hysteresis induced losses in the magnet (e.g., heat) by redirecting flux as discussed above.

Shoulders 147 and 304 may comprise any surface configuration that avoids the spacial concentration of flux near the face of the cap that would otherwise occur if the face of the cap terminated in a corner of 90 degrees or less. For example, referring again to FIG. 2, flux is more highly concentrated in the immediate vicinity of line 151 passing through corner 152 of consequence pole 150 than concentrated in the immediate vicinity of line 141 passing through shoulder 147 of cap 148. In addition to providing lower flux concentration (and consequently less associated eddy currents and heat), the material in the immediate vicinity of shoulder 147 is not exposed to the greater range of flux direction experienced in the immediate vicinity of corner 152. More efficient operation of alternator 100 results at least in part (directly or indirectly) from so limiting the range of flux direction variation.

A shoulder in cross section may comprise a series of straight segments to avoid angles of 90 degrees or less; with one or a series of nonlinear segments; or with any combination of straight and curved segments. For example, as shown in FIG. 3, shoulder 147 preferably exhibits a cross section of a circular arc formed with radius 308. Radius 308 may be determined with reference to height H, for example in the range 89%H<R<111%H or approximately equal to height H as shown. The adverse affects on magnet 146 that may occur as a result of H being too thin, as discussed above, may be accounted for by increasing cap length L (and magnet material) when a substantial portion of length L does not exhibit the full height H.

A cap may provide a face that facilitates a uniform gap dimension. For example, by forming face 149 with a radius 310 measured from center 108, a gap dimension measured radially from any pole toward face 149 is maintained relatively uniform.

An alternate cap may provide a shoulder only on the leading edge of a pole with respect to the relative motion seen by the pole.

Figure 4:
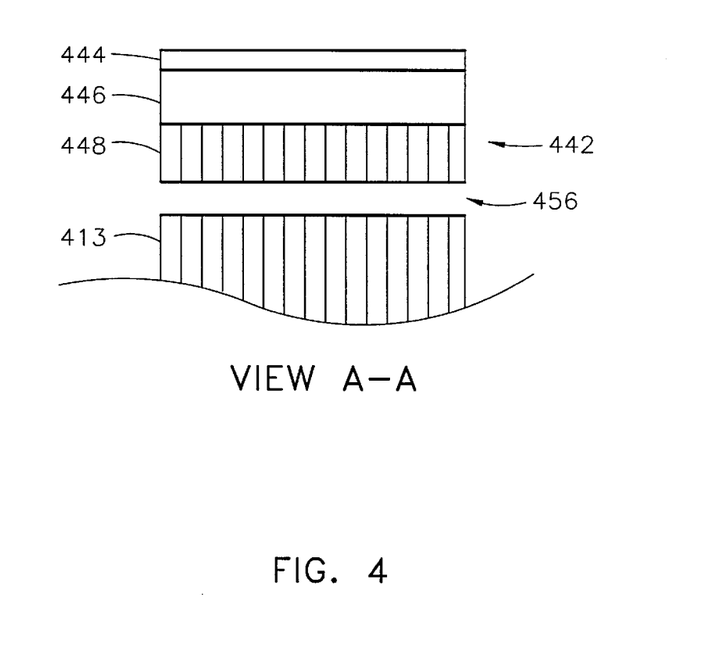
FIG. 4 is a cross section of the alternator of FIG. 1 taken as indicated at plane A—A in an implementation having a cap formed with laminations.

Another alternate cap, according to various aspects of the present invention, is formed as a laminated structure instead of an HPLC element, as discussed above. For example, pole 442 of FIG. 4 is shown in cross section as if installed in rotor 140. (As an HPLC element, cap 148 in such a cross section view would appear as a homogeneous solid.) Pole 442 suitably comprises an HPLC element formed as base 444, a permanent magnet 446, and a cap 448. A gap 456 separates cap 448 from stator pole 413. Laminations used to form cap 448 and stator pole 413 may consist of thin sheets of magnetically soft material (e.g., iron, soft iron, steel, or nickel alloy). The laminations used to form cap 448 may have the dimensions and features similar to cap 148 as discussed above with reference to FIG. 3.

Figure 5:
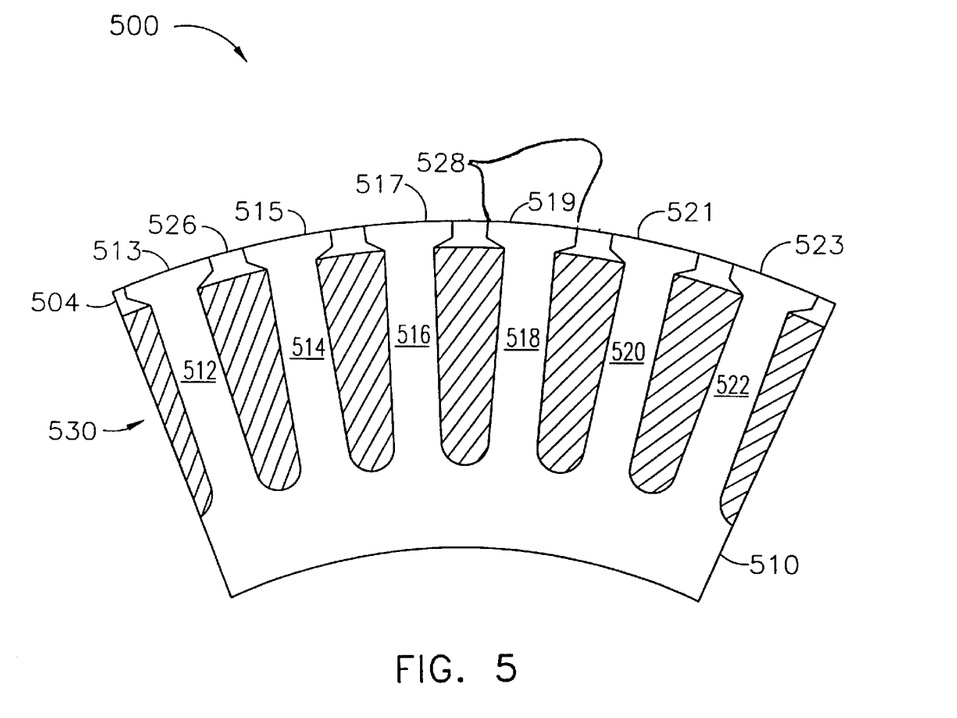
FIG. 5 is a cross section of a stator for use in an alternate electromagnetic apparatus according to various aspects of the present invention.

A series of HPLC elements may be included in several independent magnetic circuits, according to various aspects of the present invention. For example, referring to FIG. 5, an electromagnetic apparatus 500 includes a stator 510, encircled by a band 504. Stator 510 includes winding 530 and poles 512 through 522 corresponding generally in function to similarly numbered elements of alternator 100. Poles 512 through 522 include caps 513 through 523 formed as a unit in band 504 and spaced by material 526 between caps. Each cap may have corners or shoulders 528 as desired to provide performance as discussed above. Cap regions of band 504 may be formed in situ. Alternatively, band 504 may be formed as a tape (or in arcs) and later wrapped about or attached to stator 510. Alignment of caps on poles may be facilitated by energizing one or more poles of stator 510 during assembly of band 504 on stator 510.

Though a laminated structure may conduct flux equally well in the 2 major dimensions of each lamination, an HPLC element may be used to conduct flux in any direction. When, in an electromagnetic apparatus, flux through a solid can follow paths each wholly contained in one plane, that solid may be constructed of laminated material to reduce eddy current losses. On the other hand, where flux is desired to flow through a solid along paths such that each path cannot wholly be contained in a plane, that solid may advantageously be formed consisting of or comprising in relevant part an HPLC element.

Figure 6:
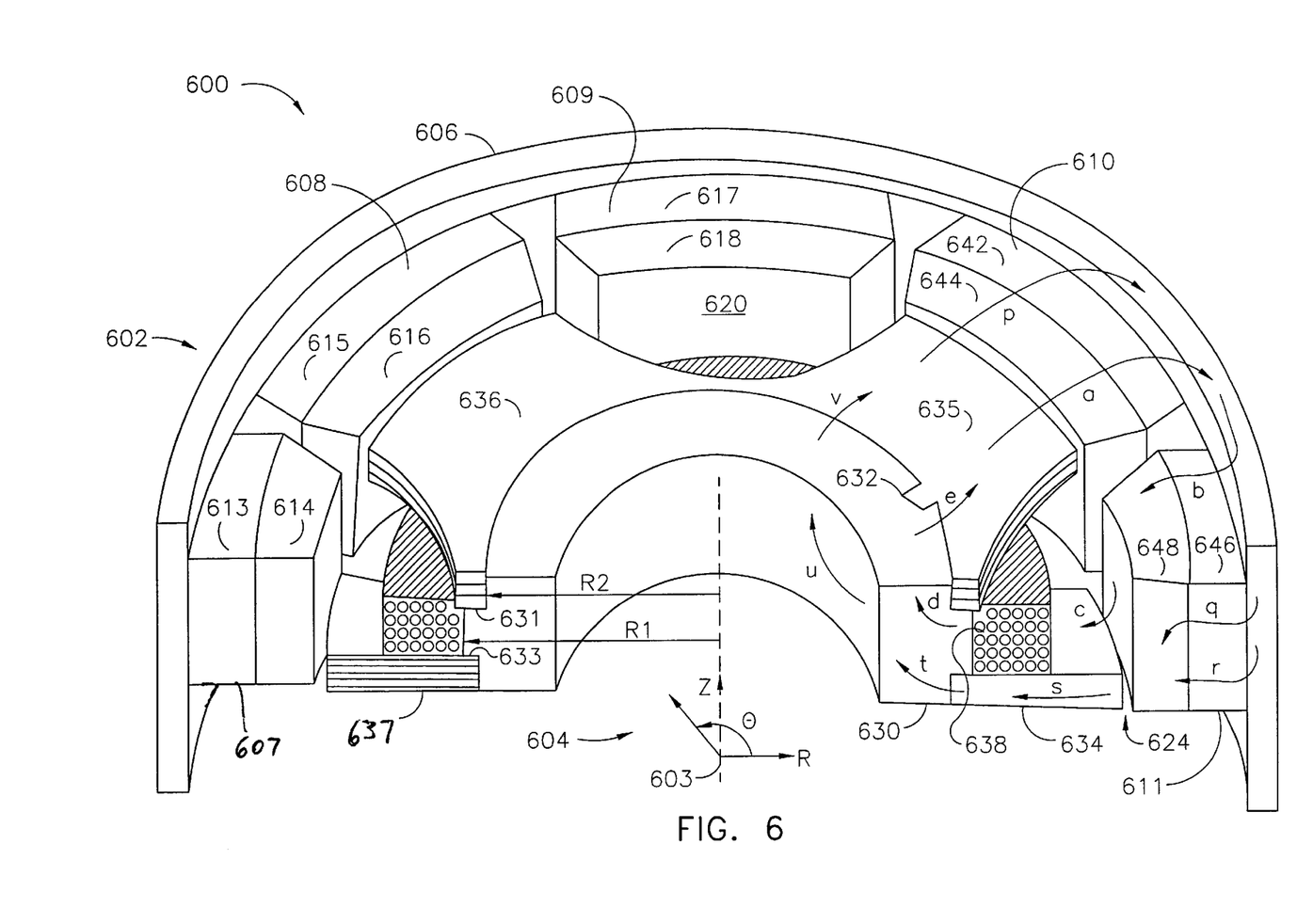
FIG. 6 is a perspective cross section view of a single-phase alternator according to various aspects of the present invention.
Figure 7:
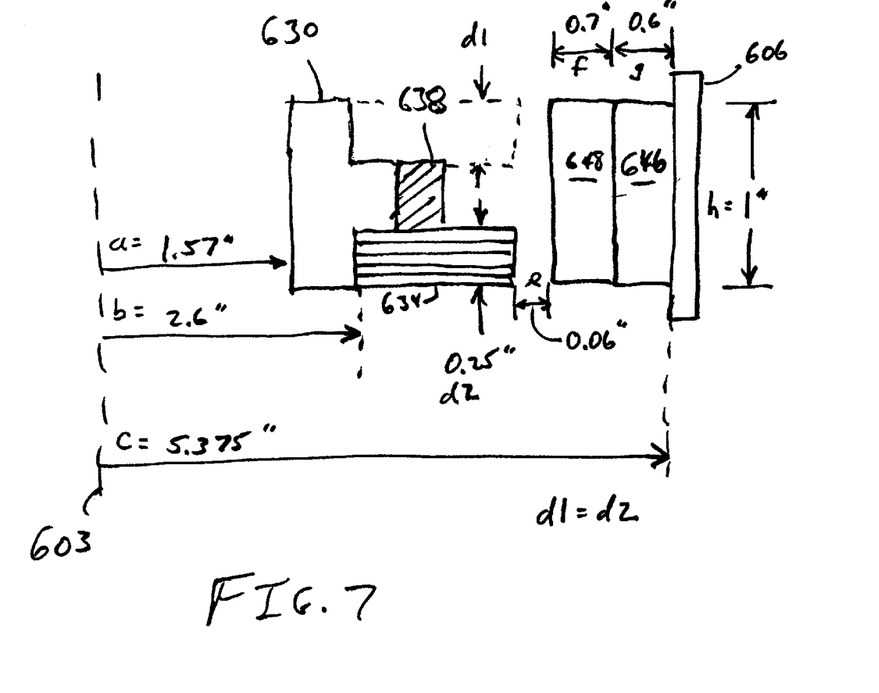
FIG. 7 is a cross section of a portion of the alternator of FIG. 6.

In a rotary alternator implementation of an exemplary electromagnetic apparatus according to various aspects of the present invention, poles of a stator and opposing poles of a rotor may be suitably arranged along first and second concentric arcs (e.g., circles) and spaced apart along the circumference and along the axis of rotation to define magnetic circuits having non-planar flux paths. The first arc may be smaller in radius than the second, providing a stationary internal stator with an external coaxial rotor. For example, referring to. FIG. 6, an exemplary single-phase alternator 600 includes a stator 602 and a rotor 604 that rotates about axis 603. Dimensions for an exemplary configuration are shown in FIG. 7. Alternate designs may employ dimensions and dimensional ratios similar to the configuration of FIG. 7. Dimensional ratios may range plus or minus 20% from ratios based on the values shown.

Rotor 604 includes body 606 of soft iron or steel and active poles 607 through 611 (poles 607 and 611 shown in cross section). Active poles 607 through 611 are affixed to body 606 in any conventional manner, as discussed above. Each active pole 607 through 611 may include a ferrite magnet or a high energy product permanent magnet comprising a rare earth material as discussed above (e.g., 613, 615, 617, 642, and 646) and a cap (e.g., 614, 616, 618, 644, and 648) comprising an HPLC element as discussed above with reference to cap 148. Poles 607 through 611 are affixed in spaced arrangement about an interior face and circumference of body 606 with magnetic poles in alternating north-south sequence.

Stator 602 includes a first four-pole plate 634, a hub 630, a winding 638, and a second four-pole plate 636. Stator 602 may be assembled by aligning and press-fitting plate 634 onto hub 630 until it rests against face 633, placing winding 638 over hub 630, and finally aligning and press-fitting plate 636 onto hub 630 until it rests against face 631. Plates 634 and 636 may serve to retain winding 638 in a predetermined position along the z coordinate (i.e., along axis 603). Plates 634 and 636 may be formed of laminations (as shown) or as HPLC elements. Hub 630 is preferably formed as an HPLC element. Plate 634 and hub 630 may be formed as a unit. Hub 630 may be formed in sections to permit thermal expansion. A hub section may include stator poles used in place of plates 634 and 636.

Positions about hub 630 may be established for plates 634 and 636 and for winding 638 using a key way (e.g., 632) or in any conventional manner (e.g., adhesives, noncircular mating surfaces, or fasteners). Plates 634 and 636 may be identical in structure and placed on hub 604 at any coordinate angle θ (i.e., measured about axis 603) relative to each other (e.g., 45 degrees as shown for an 8 pole stator). Every other pole of stator 604 is thus aligned at an index +45 degrees from the preceding pole and is located in a plane different from the preceding pole. Alternately, poles may be grouped to form a magnetic flux circuit (e.g., a single or multiple phase circuit), each member of the group being indexed in both z and θ coordinates relative to another member of the group. Plate 634 is also indexed an incremental amount along the z coordinate (e.g., along the length of axis 603 of rotation). The spacing along the z coordinate is sufficient for locating winding 638 between plates 634 and 636.

Winding 638 may be a single-phase winding formed for example by a predetermined number of clockwise turns about axis 603. Winding 638 may be made as a unit from conventional enameled magnet wire or insulated conductive tape and may be potted to simplify assembly and reduce vibration. Winding 638 may be wound directly on hub 630 or on a bobbin by conventional techniques. The inner radius RI of winding 638 may be less than or equal to the radius R2 of plate 636 and/or 638.

In operation, rotor 602 is driven by a prime mover (not shown) to generate current in winding 638 of stator 604. Winding 638 passes through a magnetic circuit that includes two poles of rotor 602 and two poles of stator 604. Because adjacent stator poles are indexed in both z and θ, it is desirable to facilitate flux in hub 630 to flow in nonplanar paths. For example, representative flux paths include: path a-b-c-d-e and path p-q-s-t-u-v. Other paths (not shown) may include path segments in cap 644 analogous to segments b and q in cap 648. These other paths may connect with path segment r. Note that some path segments in caps 644 and 648 as well as all path segments in hub 630 are advantageously nonplanar to more evenly distribute flux density and to employ the full capability of each of poles 635, 610, 611, and 634.

Particular advantages are provided by hub 630 when completely formed of HPLC material: (a) flux paths in all directions are equally facilitated; and (b) eddy currents in all directions are limited by the nonconductive property of the binder of the HPLC element. Though HPLC materials reach saturation flux density at lower flux density than soft iron, these materials are generally lighter weight that soft iron and more HPLC material may generally be used in comparison to soft iron to reduce flux density without exceeding a total weight allowance for the stator. Further, by providing a shoulder on caps 614, 616, 618, 644, and 648, flux from magnets 613, 615, 617, 642, and 646 may be directed away from adjacent opposite polarity poles and into an adjacent stator pole for higher energy efficiency. Consequence poles may be used in alternator 600 in a manner similar to consequence poles discussed above. Affixing a cap on each consequence pole is preferred for reducing flux density in the consequence pole.

The principles of construction and operation discussed above with reference to electromagnetic apparatus for generating electricity may be applied to converting electricity into motion. For example, a motor formed as described with reference to alternator 600 may be operated by driving winding 638 with an alternating current (e.g., comprising a sine, square, triangle, or pulsed waveform). Motor rotation may be started with a suitable mechanism such as an auxiliary electromagnetic element, a further set of stator poles suitably indexed and driven from a second winding or coil, an external manually input rotation, or an external starting prime mover. Once in operation, the rotational speed (e.g., RPM) of the motor may be controlled by adjusting the frequency of AC voltage applied to the winding. An auxiliary electromagnetic element may include a tapped toroidally wound winding having portions energized in sequence to urge rotor movement in a desired direction. A self-starting three-phase motor may include a winding similar to winding 638 for each phase. One or two pole plates for each phase may sandwich the appropriate phase winding. The pole plates and winding for each phase may be spaced along the axis of rotation to decouple magnetic interaction or may be integrated (e.g., one pole plate participating in the magnetic circuits of more than one phase).

The foregoing is a description of preferred exemplary embodiments and best mode of the invention known to the applicant at the time of filing the application. The invention is not limited to the specific forms shown. For example, modifications may be made in the design and arrangement of the elements within the scope of the invention, as expressed in the appended claims.

What is claimed is:

1. A pole for use in a magnetic circuit, the pole comprising:
 a. a flux-passing portion comprising a face through which magnetic flux passes; and
 b. a cap fixed to the face wherein:
  (1) the cap passes the portion of the magnetic flux;
  (2) the cap is formed with a first surface facing the flux-passing portion and a second surface opposite to the first surface, the second surface being joined to the first surface by a shoulder;
  (3) the cap comprises magnetically permeable particles disposed in a binder having lower electrical conductivity than the particles so as to impede eddy currents in the cap;
  (4) the cap has a first thickness having a maximum at the shoulder; and
  (5) the shoulder has a radius in the range of 89% to 111% of the thickness at the shoulder.

2. A pole for use in a magnetic circuit, the pole comprising:
 a. a magnet; and
 b. a cap formed with a first surface facing the magnet and a second surface opposite to the first surface, the second surface being joined to the first surface by a shoulder, wherein:
  (1) the cap comprises magnetically permeable particles disposed in a binder having lower electrical conductivity than the particles so as to impede eddy currents in the cap;
  (2) the cap has a maximum thickness at the shoulder; and
  (3) the shoulder has a radius in the range of 89% to 111% of the maximum thickness.

3. A pole for use in a magnetic circuit, the pole comprising:
 a. means for passing magnetic flux comprising a face through which at least a portion of the magnetic flux passes; and
 b. a cap fixed to the face, wherein:
  (1) the cap passes the portion of the magnetic flux;
  (2) the cap is formed with a first surface facing the means for passing and a second surface opposite to the first surface, the second surface being joined to the first surface by a shoulder;
  (3) the cap comprises magnetically permeable particles disposed in a binder having lower electrical conductivity than the particles so as to impede eddy currents in the cap;
  (4) the cap has a first thickness having a maximum at the shoulder; and
  (5) the shoulder has a radius in the range of 89% to 111% of the thickness at the shoulder.

4. The pole of claim 3 wherein the means for passing flux comprises:
 a. a base; and
 b. a magnet fixed to the base, the magnet comprising the face.

5. The pole of claim 4 wherein the magnet comprises a permanent magnetic.

6. The pole of claim 4 wherein the magnet comprises an electromagnet.

7. The pole of claim 4 wherein:
 a. the magnet has a second thickness; and
 b. the first thickness is in the range from 50% to 75% of the second thickness.

8. The pole of claim 4 wherein:
 a. the magnet has a second thickness; and
 b. the first thickness is in the range from 60% to 70% of the second thickness.

9. The pole of claim 4 wherein the magnet has an energy product greater than 40,000.

10. The pole of claim 4 wherein the magnet comprises a flat surface opposite the face, the surface for fixing the magnet to the base.

11. The pole of claim 4 wherein the face is flat and the magnet comprises a flat surface opposite the face, the surface for fixing the magnet to the base.

12. A rotor comprising the pole of claim 3.

13. A stator comprising the pole of claim 3.

14. A pole for use in a magnetic circuit, the pole comprising:
 a. means for passing magnetic flux comprising a face; and
 b. a cap fixed to the face, wherein:
  (1) the cap passes a majority of the magnetic flux passed by the means for passing;
  (2) the cap is formed with a first surface facing the means for passing and a second surface opposite to the first surface, the second surface being joined to the first surface by a shoulder;
  (3) the cap comprises magnetically permeable particles disposed in a binder having lower electrical conductivity than the particles so as to impede eddy currents in the cap; and
  (4) the cap has an average thickness and has a thickness at the shoulder greater than the average thickness.

15. The pole of claim 14 wherein the shoulder has a radius in the range from 89% to 111% of the thickness at the shoulder.

16. The pole of claim 15 wherein the magnet comprises a permanent magnetic.

17. The pole of claim 15 wherein the magnet comprises an electromagnet.

18. The pole of claim 15 wherein:
 a. the magnet has a second thickness; and
 b. the first thickness is in the range from 50% to 75% of the second thickness.

19. The pole of claim 15 wherein:
 a. the magnet has a second thickness; and
 b. the first thickness is in the range from 60% to 70% of the second thickness.

20. The pole of claim 15 wherein the magnet has an energy product greater than 40,000.

21. The pole of claim 15 wherein the magnet comprises a flat surface opposite the face, the surface for fixing the magnet to the base.

22. The pole of claim 15 wherein the face is flat and the magnet comprises a flat surface opposite the face, the surface for fixing the magnet to the base.

23. The pole of claim 14 wherein the means for passing flux comprises:
 a. a base; and
 b. a magnet fixed to the base, the magnet comprising the face.

24. A rotor comprising the pole of claim 14.

25. A stator comprising the pole of claim 14.

26. A rotor comprising:
a. a body comprising magnetically permeable material;
b. a magnetic pole in magnetic communication with the body, the magnetic pole comprising a source of magnetic flux;
c. a consequence pole in magnetic communication with the body, the consequence pole comprising a base having a first face and a region of the first face where a flux density is expected; and
d. means, fixed to the base, for lowering the flux density in the region, the means comprising magnetically permeable particles disposed in a binder having lower electrical conductivity than the particles so as to impede eddy currents between the particles.

27. The rotor of claim 26 wherein:
a. the consequence pole and the means for lowering provide a first area for magnetically coupling with a provided stator; and
b. the magnetic pole comprises a second area for magnetically coupling with the stator, the second area being greater than the first area.

28. The rotor of claim 27 wherein the second area is greater than the first area by the ratio of operating flux density of the magnet to operating flux density of the consequence pole.

29. The rotor of claim 26 wherein the means for lowering comprises a shoulder having a thickness and a radius in the range from 89% to 111% of the thickness.

30. The rotor of claim 26 wherein:
a. the rotor turns about an axis; and
b. the means for lowering comprises a surface formed in an arc about the axis.

31. A rotor comprising:
a. a body comprising magnetically permeable material;
b. a consequence pole in magnetic communication with the body, the consequence pole having a first face for coupling magnetic flux with a provided stator; and
c. a magnetic pole in magnetic communication with the body, the magnetic pole comprising:
 (1) a base;
 (2) a magnet fixed to the base;
 (3) a second face comprising a region where a flux density is expected; and
 (4) means, fixed to the second face, for lowering the flux density in the region, the means comprising magnetically permeable particles disposed in a binder having lower electrical conductivity than the particles so as to impede eddy currents between the particles.

32. The rotor of claim 31 wherein:
a. the consequence pole comprises a first area for magnetically coupling with a provided stator; and
b. the magnet and the means for lowering provide a second area for magnetically coupling with the stator, the second area being greater than the first area.

33. The rotor of claim 32 wherein the second area is greater than the first area by the ratio of operating flux density of the magnet to operating flux density of the consequence pole.

34. The rotor of claim 31 wherein the means for lowering comprises a shoulder having a thickness and a radius in the range from 89% to 111% of the thickness.

35. The rotor of claim 31 wherein:
a. the rotor turns about an axis; and
b. the means for lowering comprises a surface formed in an arc about the axis.

36. The rotor of claim 31 wherein the magnet comprises a flat surface for fixing the magnet to the base.

* * * * *